United States Patent [19]

Hutchinson et al.

[11] 4,153,125

[45] May 8, 1979

[54] DIGITAL ELECTRONIC SCALE

[75] Inventors: William Y. Hutchinson, Chicago; Walter P. Kushmuk, Niles, both of Ill.

[73] Assignee: Continental Scale Corporation, Bridgeview, Ill.

[21] Appl. No.: 794,058

[22] Filed: May 5, 1977

[51] Int. Cl.$^2$ .................. G01G 3/14; G01G 21/02
[52] U.S. Cl. .................. 177/211; 177/241; 177/DIG. 9
[58] Field of Search .......... 177/211, 126–128, 177/238–244, DIG. 3, DIG. 9

[56] References Cited

U.S. PATENT DOCUMENTS

| | | | |
|---|---|---|---|
| 1,908,236 | 5/1933 | Hallwood | 177/241 X |
| 2,598,812 | 6/1952 | Marco | 177/211 X |
| 3,724,574 | 4/1973 | Hutchinson | 177/210 |
| 3,831,687 | 8/1974 | Maffia | 177/211 |
| 4,008,776 | 2/1977 | Kushmuk | 177/241 X |

Primary Examiner—Joseph W. Hartary
Attorney, Agent, or Firm—Richard L. Johnston

[57] ABSTRACT

A platform type weighing scale is provided having a horizontally disposed base, a vertically disposed column mounted on an extension of said base with a hollow base portion in said column and a load beam mounted in said hollow base portion connected through a lever to a weighing mechanism beneath said platform, said load beam having one or more electrical strain gauges mounted thereon which are connected to a read-out meter mounted on said column to show measurements in units of weight. The housing for the read-out meter is preferably adapted to rotate horizontally or to tilt from the vertical or both and can also be removed so as to provide a number of options including a high level scale, a waist high personal scale, or a desk top or wall mounted remote unit.

8 Claims, 14 Drawing Figures

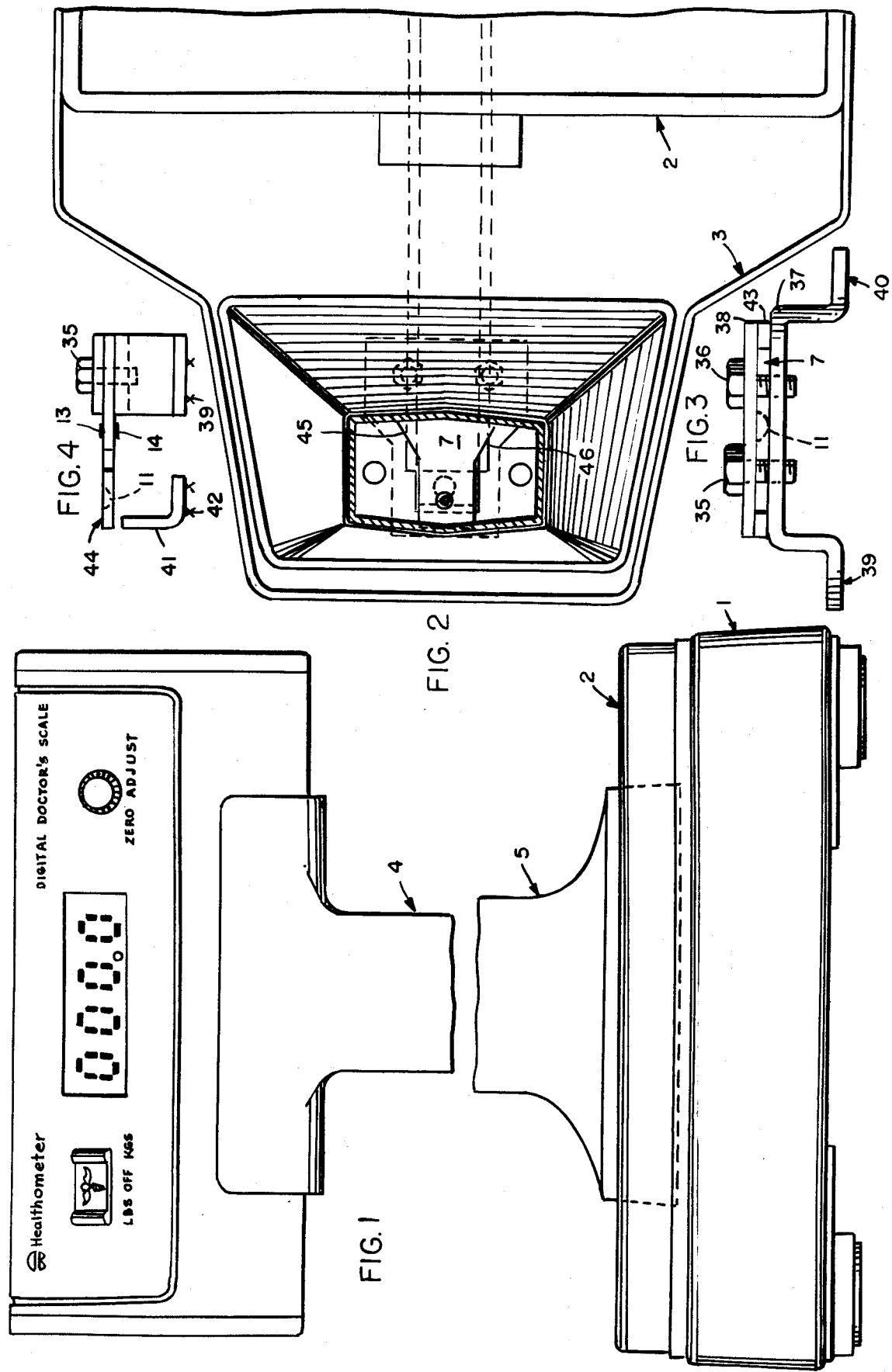

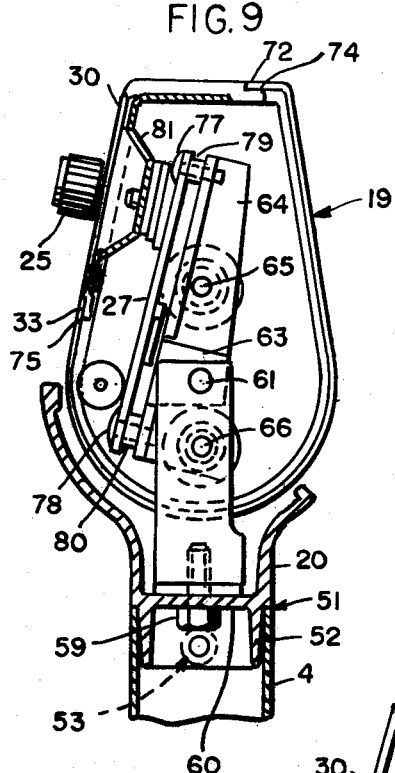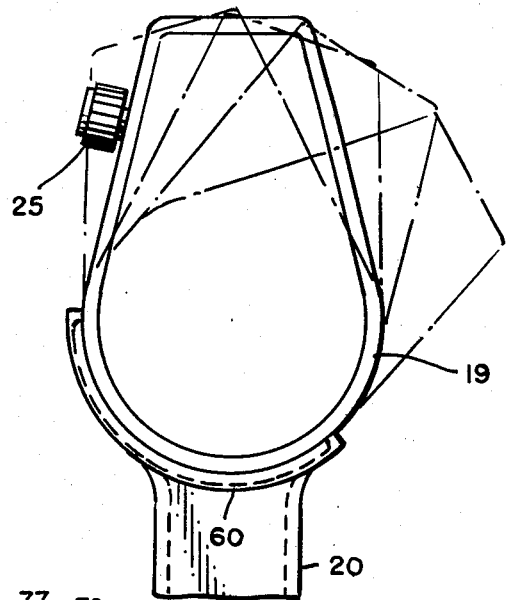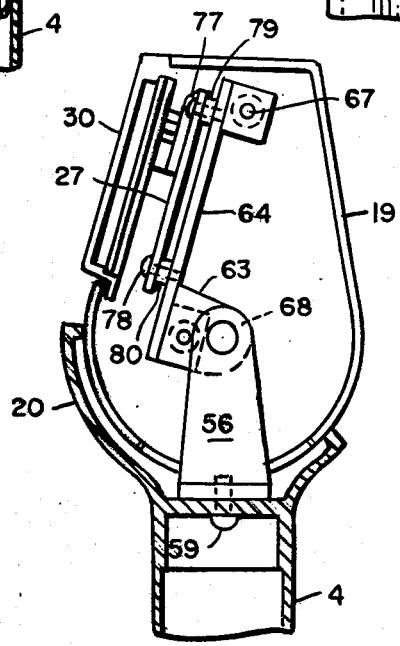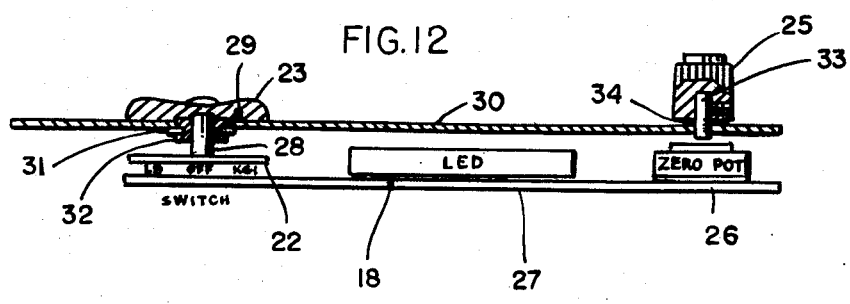

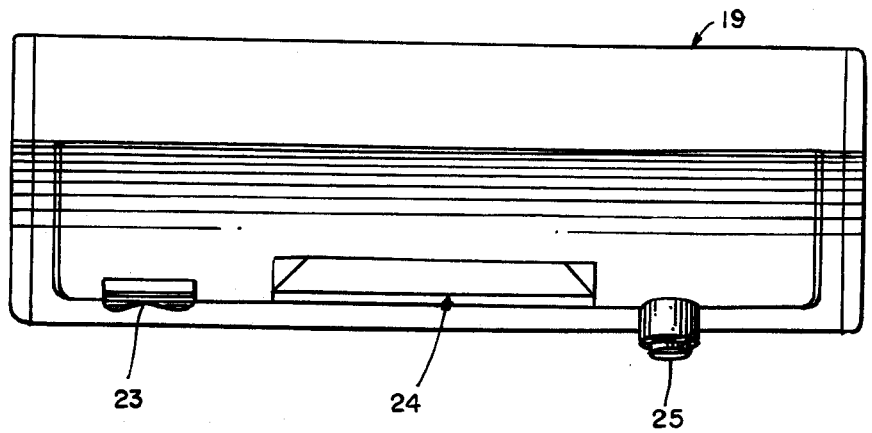
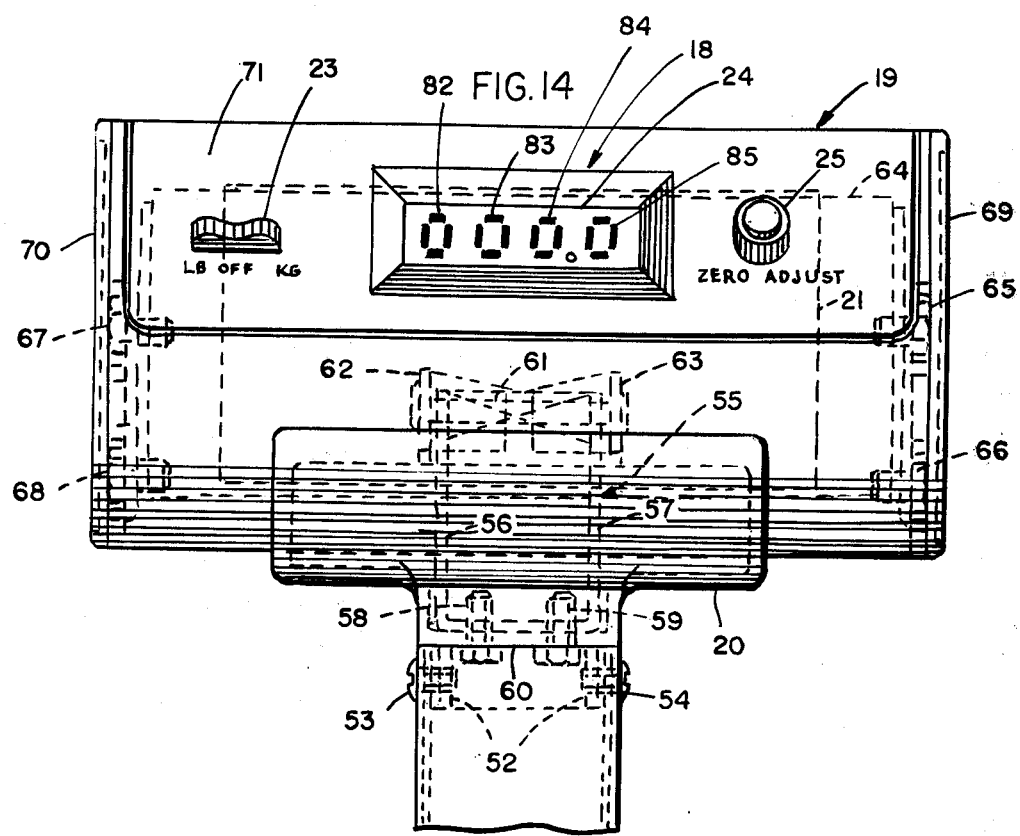

DIGITAL ELECTRONIC SCALE

BACKGROUND

Many different types of electrically actuated weighing scales have been disclosed in prior art U.S. Patents such as, for example, Nos. 2,598,812, 2,899,191, 3,443,652, 3,469,645, 3,658,143, 3,666,032, 3,938,603 and 3,993,150.

These weighing scales involve the use of strain gauges in various ways and with various types of structures. Some of them are especially adapted for weighing packages, others for weighing vehicles and others are personal weighing scales.

OBJECTS

One of the objects of the present invention is to provide a new and improved digital electronic scale using a conventional doctor's scale base, lever and platform assembly with a cantilever beam fastened to the base and attached to the nose iron which deflects in proportion to the load applied.

Another object of the invention is to provide a personal weighing scale which can be manufactured at low cost and high volume as contrasted with scales presently available which have to be precision machined and are relatively costly.

A further object of the invention is to provide a scale of the type described in which an electronic read-out unit is mounted in a housing which is tiltable in a vertical plane and rotatable in a horizontal plane and, if necessary, can be removed for placement in a position on a desk or mounted on a wall.

Still a further object of the invention is to provide a digital electronic scale which can be used with a pediatric scale by simply changing the load deflection characteristics of a load beam containing one or more strain gauges.

Another object of the invention is to provide a digital electronic scale which can be used either with a conventional alternating current supply, rechargeable batteries or dry cells.

A further object of the invention is to provide a new and improved electronic weighing scale in which a modular electronic unit containing a circuit board is mounted in a housing supported by a column which in turn is supported by a base of the scale. Other objects and advantages of the invention will appear from the following description in conjunction with the accompanying drawings.

BRIEF SUMMARY OF THE INVENTION

A platform type weighing scale is provided having a horizontally disposed base, a vertically disposed column mounted on an extension of said base with a hollow base portion in said column and a load beam mounted in said hollow base portion connected through a lever to a weighing mechanism beneath said platform, said load beam having one or more electrical strain gauges mounted thereon which are connected to a read-out meter mounted on said column to show measurements in units of weight. The housing for the read-out meter is preferably adapted to rotate horizontally or to tilt from the vertical or both and can also be removed so as to provide a number of options including a high level scale, a waist high personal scale, or a desk top or wall mounted remote unit.

THE DRAWINGS

In the drawings:

FIG. 1 represents a front elevational view, with parts broken away, of a weighing scale illustrating a preferred embodiment of the invention;

FIG. 2 is a plan view of the embodiment shown in FIG. 1 with the upper portion removed;

FIG. 3 is a detailed view of one portion of the apparatus illustrated in FIGS. 1 and 2 showing the structure of the supporting means for the load beam;

Figure 5:
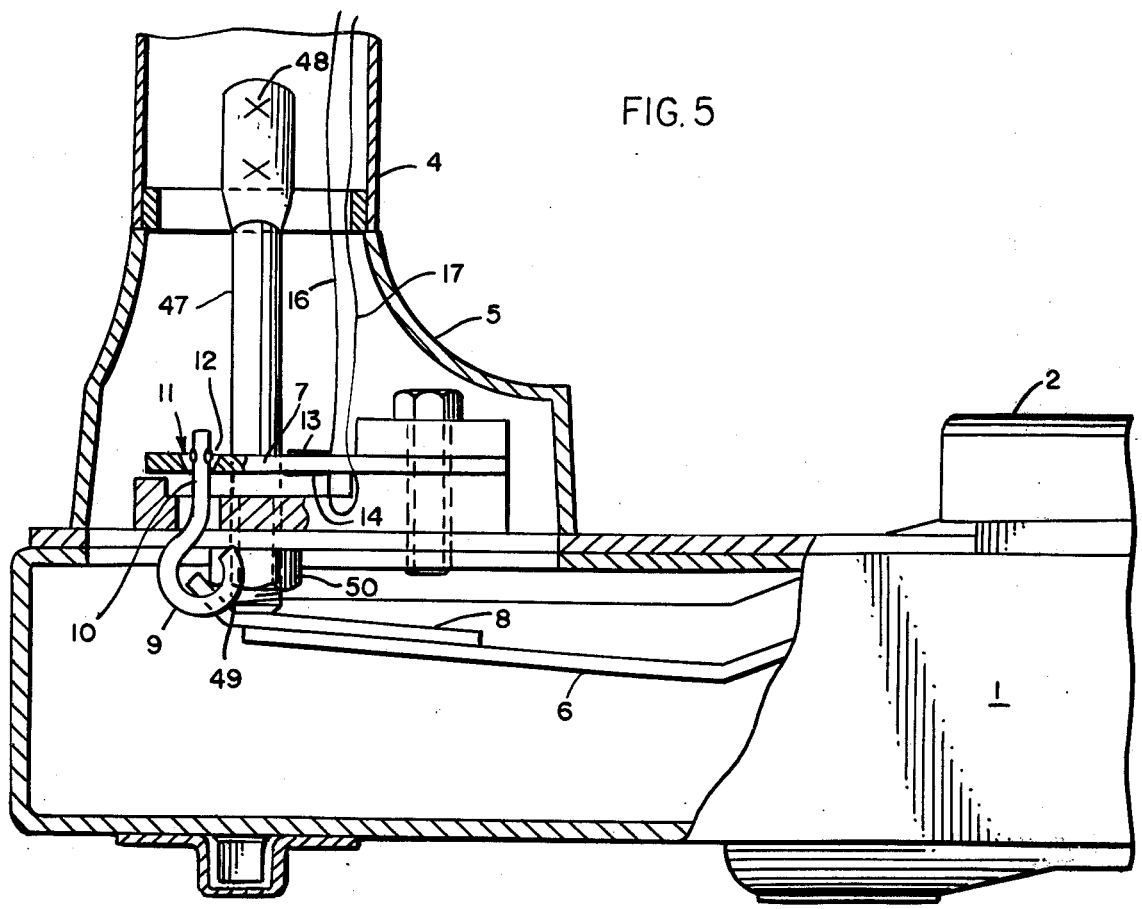
Figure 8:
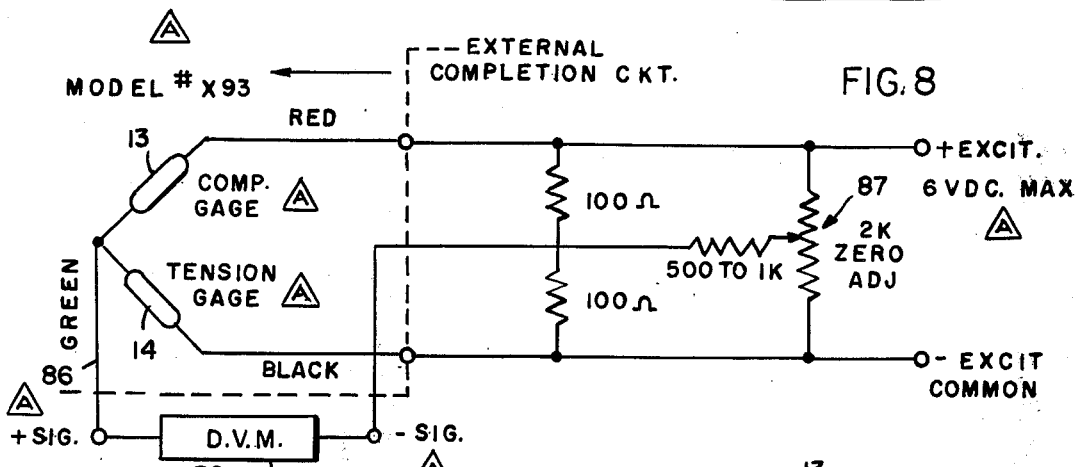
Figure 6:
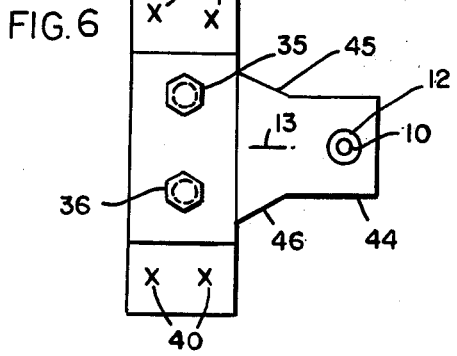
Figure 7:
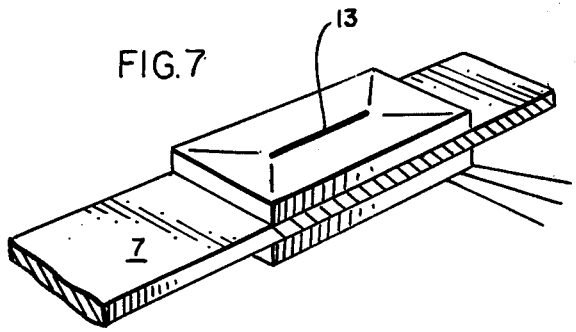

FIG. 4 corresponds to the view shown in FIG. 3 rotated through an angle of 90°;

FIG. 5 is a side view, with parts broken away, of the embodiment shown in FIGS. 1 and 2;

FIG. 6 is a top plan view of the load beam section illustrated in FIGS. 3 and 4;

FIG. 7 is a detailed view, partially in section, enlarged to show the strain gauges carried on the upper and lower sides of the load beam illustrated in FIGS. 3, 4 and 6;

FIG. 8 is a wiring diagram illustrating the electrical circuitry connecting the read-out meter and the strain gauges to a source of electrical energy;

FIG. 9 is a side view, with parts removed, and partly in section, of the housing for the read-out unit;

FIG. 10 is a side view of the housing for the read-out unit showing different positions when the housing is tilted from the vertical;

FIG. 11 is another view of the housing for the read-out unit illustrating the manner in which it is mounted;

FIG. 12 is a plan cross sectional view taken transversely of a portion of the read-out unit;

FIG. 13 is a top plan view of the housing for the read-out unit shown in FIGS. 9, 10 and 11; and FIG. 14 is an enlarged front view of the housing for the read-out unit shown in FIGS. 9 to 13.

DETAILED DESCRIPTION OF THE INVENTION

Referring to FIG. 1 the platform-type weighing scale illustrated comprises:

(a) a horizontally disposed base 1 having a vertically movable weighing platform 2 mounted thereon, said base having an extension 3 as illustrated in FIG. 2 extending beyond said weighing platform;

(b) a vertically disposed column 4 mounted on said extension of said base 1, said column having a hollow base portion 5;

(c) weighing mechanism of a conventional type, not shown, mounted on said base operatively with said platform 2, said weighing mechanism including a lever 6 which moves in response to actuation of said weighing mechanism by a load placed on said platform 2, said lever 6 extending from said weighing mechanism to an area below said column as illustrated in FIG. 5;

(d) a load beam 7 mounted in the hollow portion 5 of said column 4;

(e) connecting means comprising a nose iron 8 connecting said lever 6 to a load hook 9, the load hook 9 having a shaft portion 10 extending through a conical opening 11 adjacent the end of load beam 7 and having thereon a semi-spherical portion 12, the sides of which engage the inner surfaces of the conical opening 11 so as to transmit a load from said lever 6 to cause said load beam to move a fraction of an inch in response to a load placed on platform 2;

(f) an upper strain gauge 13 and a lower strain gauge 14 mounted on opposite sides of said load beam and preferably consisting of a wire of germanium or other semi-conducting material which are secured to the upper and lower surfaces, respectively, of load beam 7 by means of a resinous coating or in any other suitable manner;

(g) a digital voltmeter 15 as diagrammatically illustrated in FIG. 8;

(h) wires 16 and 17 connecting the electrical output from strain gauges 13 and 14 from said digital voltmeter 15, and (i) a read-out meter 18 mounted in a housing 19 supported by a yoke 20 as illustrated in FIG. 14, said read-out meter being operatively associated with said digital voltmeter 15 to show measurements in units of weight.

The digital voltmeter is disposed in a replaceable module 21 which contains a slide switch 22 operable from knob 23 and movable from an off-position to a lefthand position to close a circuit in order to show weight by a L.E.D. signal in pounds at the display area 24 and movable to a righthand position to close a circuit to show weight in kilograms in the display area 24. An adjusting knob 25 is rotatable to adjust zero potential through a conventional zero potential adjuster 26. The necessary circuitry is all mounted on a circuit board 27 as illustrated in FIG. 12.

The slide switch 22 is connected through a shaft 28 to knob 23, the shaft 28 being slidable in a slot 29 in lens 30 and being retained in said slot by a U-shaped washer 31 inserted in collar 32.

The zero potential adjusting mechanism 26 is connected by a shaft 33 to knob 25, the shaft 33 passing through a hole at 34 in lens 30.

Referring to FIGS. 2–5, it will be seen that the load beam 7 is clamped by means of bolts 35 and 36 between a load beam support 37 and a load beam clamp 38. The load beam support 37 is welded to the base 1 at 39 and 40. The stop member 41 is also welded to the base 1 at 42. The load beam 7 as shown is flat with upper and lower sides and has a transverse portion 43 which is generally rectangular and is clamped between members 37 and 38. The outer end 44 is free. The sides of load beam 7 are tapered at 45 and 46 in an intermediate area between the clamped end and the free end and the strain gauges 13 and 14 are disposed centrally in the tapered area whereby stress applied adjacent the free outer end from the lever 6 through the nose iron 8, the nose hook 9, shaft 10 and semi-spherical member 12 is substantially uniform throughout the load beam.

In the embodiment shown, the column 4 rests on the top of the hollow base portion 5 and is secured to the base 1 by means of a spade screw 47 which is welded to the side of column 4 at 48 and fastened to base 1 by means of the threaded end 49 and nut 50 (see FIG. 5). The yoke 20 has an offset portion 51 which rests on top of column 4 as shown in FIG. 9 and also has a downwardly extending portion 52 which nests inside the top of column 4. Column 4 in the embodiment shown is polygonal in cross section but can be circular. Yoke 20 is preferably fastened to column 4 by means of screws 53 and 54 (see FIG. 14) which can be removed so as to permit the removal of yoke 20 and rotation through an angle of 180°. A U-shaped bracket 55 having upwardly extending legs 56 and 57 is attached by means of screws 58 and 59 to the base 60 of yoke 20. At its upper end bracket 55 has opposing holes to receive a carriage bolt 61. Arm members 62 and 63 which are a part of mounting plate 64 are mounted for rotation on bolt 61. Mounted plate 64 extends transversely of the housing 19 and is secured by means of screws or bolts 65, 66, 67 and 68 to end plates 69 and 70.

The upper part of housing 19 has an open area to receive a lens 30 which is made of a transparent polycarbonate material (Lexan) or any other suitable transparent material which is relatively rigid but sufficiently flexible to be snapped into place in said housing. The ends 72 and 73 of lens 30 are disposed between the inner surface 74 of housing 19 and the inner surface 75 of housing 19. Printed circuit board 27 is fastened by bolts 77 and 78 through spacers 79 and 80 to mounting plate 64. A bezel 81 provides an opening to the display area 24 wherein digits are displayed at 82, 83, 84 and 85 in L.E.D. form.

A pair of semi-conductor strain gauges 13 and 14 which are bonded to the surfaces of the load beam 7 one on top to sense the tensile strain (elongation) and one on the bottom to sense the compressive strain (compression) of the beam's outer surfaces as it bends under the load are employed in half bridge circuits as shown in FIG. 8 to electronically sense the change in resistance in the strain gauge caused by the change in length and cross sectional area as the load beam is bent. Semi-conductor strain gauges are preferably used because of their high sensitivity compared to conventional metallic gauges.

An electronic unit comprising the circuit board 27 supplies the excitation current for the strain gauges and contains the necessary circuitry to convert the proportional analogue signal to digital values and display the digital values on a digital read-out. It also provides means of converting readings to kilograms or pounds, means for calibrating a scale electronically and adjusting for zero or tare electronically by means of potentiometers. The electronic unit is mounted in the housing 19 as previously explained which is vertically tiltable around the carriage bolt 61 through a range of 30°, 60°, and 90° to enable the user to adjust it according to his height for substantially eye level readability. The yoke 20 supporting the tiltable housing can also be removed from the pillar 4 and indexed 180° if it is desirable to read the unit from the opposite side of the scale as in the case of mass weighing where it is more convenient for the observer.

The load beam 7 is preferably made of stainless steel and the total deflection for weighing up to 400 pounds on the platform 2 is preferably a maximum of 0.01" (10 mils). As previously indicated, the taper in the load beam assists in providing load beam stress throughout. The germanium strain gauges are preferably 5 mils thick by 30 mils long and have resistance values of 120 ohms or 350 ohms. Gold leads are spot welded to the strain gauges and the strain gauges are bonded by suitable resins to the load beam.

The lever reduction from the weighing mechanism in the base 1 is 10:1 for a 400 pound maximum weight and the unit operates on 6 volts direct current. Thus, for counts or gradients of 0.1 pound the current variation is 20 microvolts per count and the load beam moves 1/10 of a millionth of an inch per count.

The wiring diagram in FIG. 8 is believed to be self-explanatory. Current from a source of electricity such as a 6 volt D.C. battery or a rectifier connected to an alternating current 120 volt outlet passes through two half wheatstone bridge circuits to strain gauges 13 and 14 and thence through output line 86 to digital voltmeter 15 in the digital read-out unit where a signal is recorded and displayed. The zero potential is adjusted at 87 by means of knob 25 in a conventional manner through the circuitry in the read-out unit. The units of weight can be displayed either in pounds or kilograms by moving the slide switch knob 23 to the left or right.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A platform type weighing scale comprising:
   (a) a horizontally disposed base having a vertically movable weighing platform mounted thereon, said base having an extension beyond said weighing platform,
   (b) a vertically disposed column mounted on said extension of said base of (a), said column having a hollow base portion,
   (c) weighing mechanism mounted on said base operatively associated with said platform of (a), said weighing mechanism including a lever which moves in response to actuation of said weighing mechanism by a load placed on said platform of (a), said lever extending from said weighing mechanism to an area below said column,
   (d) a load beam mounted on said extension of said base of (a) in said hollow base portion of said column of (b),
   (e) connecting means connecting said lever of (c) with said load beam of (d) so as to transmit a load from said lever of (c) to said load beam of (d) to produce a movement of said load beam of a fraction of an inch,
   (f) one or more electrical strain gauges mounted on said load beam,
   (g) a digital voltmeter,
   (h) means connecting the electrical output from said strain gauge of (f) to said digital voltmeter of (g), and
   (i) a read-out meter operatively associated with said digital voltmeter of (g) to show measurements in units of weight(.), said connecting means of (e) extending upwardly through a hole in said load beam of (d), said hole having conical sides and said connecting means of (e) containing a semi-spherical member to seat in said conical sides of said hole and engaging the sides of said hole whereby said load beam of (d) is pulled downwardly when a load is applied to said platform of (a) causing downward movement of said lever of (c).

2. A weighing scale as claimed in claim 1 wherein said lever of (c) is connected to said load beam of (d) through a nose iron and a load hook.

3. A weighing scale as claimed in claim 1 wherein said load beam of (d) is elongated and mounted at one end of said extension of said base by clamping it between a load beam support and a load beam clamp all secured to said extension of said base, the opposite end of said load beam being free and being connected to said means of (e).

4. A weighing scale as claimed in claim 1 wherein said load beam of (d) is flat with upper and lower sides and has a transverse portion at one end which is mounted on said extension of said base of (a) and an elongate portion extending from said transverse portion to a free outer end, said transverse portion and said elongate portion being connected by outwardly tapered portions whereby stress applied adjacent said free outer end is substantially uniform throughout the load beam, said connecting means of (e) being operatively associated with said load beam adjacent its free end, a first strain gauge of (f) mounted on the upper side of said load beam centrally of said load beam between said tapered portions, a second strain gauge of (f) mounted on the lower side of said load beam beneath said first strain gauge, and means of (h) connecting the combined output of said strain gauges to said digital voltmeter of (g).

5. A weighing scale as claimed in claim 4 wherein said load beam of (d) has a total deflection which is a maximum of 0.01 inch.

6. A weighing scale as claimed in claim 1 wherein said strain gauges of (f) are semi-conductors.

7. A weighing scale as claimed in claim 1 wherein said read-out meter of (i) is mounted in a housing attached to the top of said column of (b).

8. A weighing scale as claimed in claim 1 wherein said load beam of (d) has a total deflection which is a maximum of 0.01 inch.

* * * * *